(12) United States Patent
Asano

(10) Patent No.: US 6,922,261 B2
(45) Date of Patent: Jul. 26, 2005

(54) COLOR CORRECTING APPARATUS FOR PRINTER

(75) Inventor: Motohiro Asano, Osaka (JP)

(73) Assignee: Minolta Co., Ltd., Osaka (JP)

(*) Notice: Subject to any disclaimer, the term of this patent is extended or adjusted under 35 U.S.C. 154(b) by 853 days.

(21) Appl. No.: 09/788,421

(22) Filed: Feb. 21, 2001

(65) Prior Publication Data

US 2001/0017719 A1 Aug. 30, 2001

(30) Foreign Application Priority Data

Feb. 28, 2000 (JP) .................................. P2000-051564

(51) Int. Cl.$^7$ ............................................... G03F 3/08
(52) U.S. Cl. ..................... 358/1.9; 358/504; 358/518; 358/519; 358/520; 382/162; 382/167
(58) Field of Search ..................... 358/1.9, 504, 518, 358/519, 570, 577, 530; 382/167, 162

(56) References Cited

U.S. PATENT DOCUMENTS 5,081,529 A * 1/1992 Collette ..................... 358/504
5,809,366 A * 9/1998 Yamakawa et al. ........... 399/39
6,075,888 A    6/2000 Schwartz

FOREIGN PATENT DOCUMENTS

JP         11-112825         4/1999

* cited by examiner

Primary Examiner—Kimberly Williams
Assistant Examiner—Charlotte M. Baker
(74) Attorney, Agent, or Firm—Burns, Doane, Swecker & Mathis, LLP (57) ABSTRACT

A first reference image as a natural image is displayed on a display, and a first test image including the first reference image and a plurality of first modulated images each obtained by slightly modulating colors of the first reference image is printed. The first modulated image having color tones closest to the first reference image displayed on the display is selected by the operator, and global color correction in a color space is performed on the basis of the first reference image and the selected first modulated image. Further, a second reference image of a single color is also displayed on the display, a second test image including second modulated images is printed, one of the second modulated images is selected, and local color correction in the color space is performed on the basis of the second reference image and the selected second modulated image.

20 Claims, 10 Drawing Sheets

COLOR CORRECTING APPARATUS FOR PRINTER

This application is based on application No. 2000-051564 filed in Japan, the contents of which are hereby incorporated by reference.

BACKGROUND OF THE INVENTION

1. Field of the Invention

The present invention relates to a technique for correcting printing colors of a printer.

2. Description of the Background Art

Hitherto, a method of allowing a printer to print a number of colors patches, determining color differences between a display and the printer by the operator visually, and correcting the printing colors of the printer on the basis of the color differences is used. At this time, a print profile prepared in a computer or printer is corrected.

Such color correction is suited for correcting a specific color but is not suited for correcting differences of color tones (or differences between printed color tones and appropriate color tones) of an entire image perceived by the operator.

For example, when an output of one of color elements changes due to a change with time of the printer, an entire image in which the color element changes (for example, a reddish image) is obtained. In the case where only a specific color is corrected on the basis of the color patches, it is difficult to correct the differences in the color tones of such an entire image.

Obviously, the color tones can be seriously corrected by using a colorimeter. In this case, the operator himself/herself has to adjust the color tones in a try-and-error manner and a complicated procedure is necessary. Not all users have the colorimeter which is expensive, so that not everyone can perform the correction using the colorimeter.

SUMMARY OF THE INVENTION

An object of the invention is to realize proper correction of printing colors by a simple method without using a colorimeter.

The present invention is directed to a color correcting apparatus.

According to an aspect of the present invention, the color correcting apparatus comprises: a controller for controlling a printer to print a plurality of first modulated images obtained by modulating colors of a first reference image having a plurality of colors and a plurality of second modulated images obtained by modulating a color of a second reference image having a single color; an input device for accepting a selection of a selected first modulated image among the plurality of first modulated images in accordance with the first reference image which is displayed and a selection of a selected second modulated image among the plurality of second modulated images in accordance with the second reference image which is displayed; and correcting means for correcting information for transforming image data to print data on the basis of the selected first modulated image and the selected second modulated data, the information indicating a relation between the image data and the print data.

The color correcting apparatus corrects differences of color tones in an entire image and specific color differences between printing colors and display colors appropriately.

Preferably, the plurality of first modulated images are obtained by modulating at least one of characteristics selected from the group comprising hue, saturation, lightness and contrast of the first reference image in a plurality of ways. The plurality of second modulated images are obtained by modulating at least one of characteristics selected from the group comprising hue, saturation, lightness and contrast of the second reference image in a plurality of ways.

The invention is also directed to a color correcting method.

These and other objects, features, aspects and advantages of the present invention will become more apparent from the following detailed description of the present invention when taken in conjunction with the accompanying drawings.

DESCRIPTION OF THE PREFERRED EMBODIMENTS

<1. First Preferred Embodiment>

Figure 1:
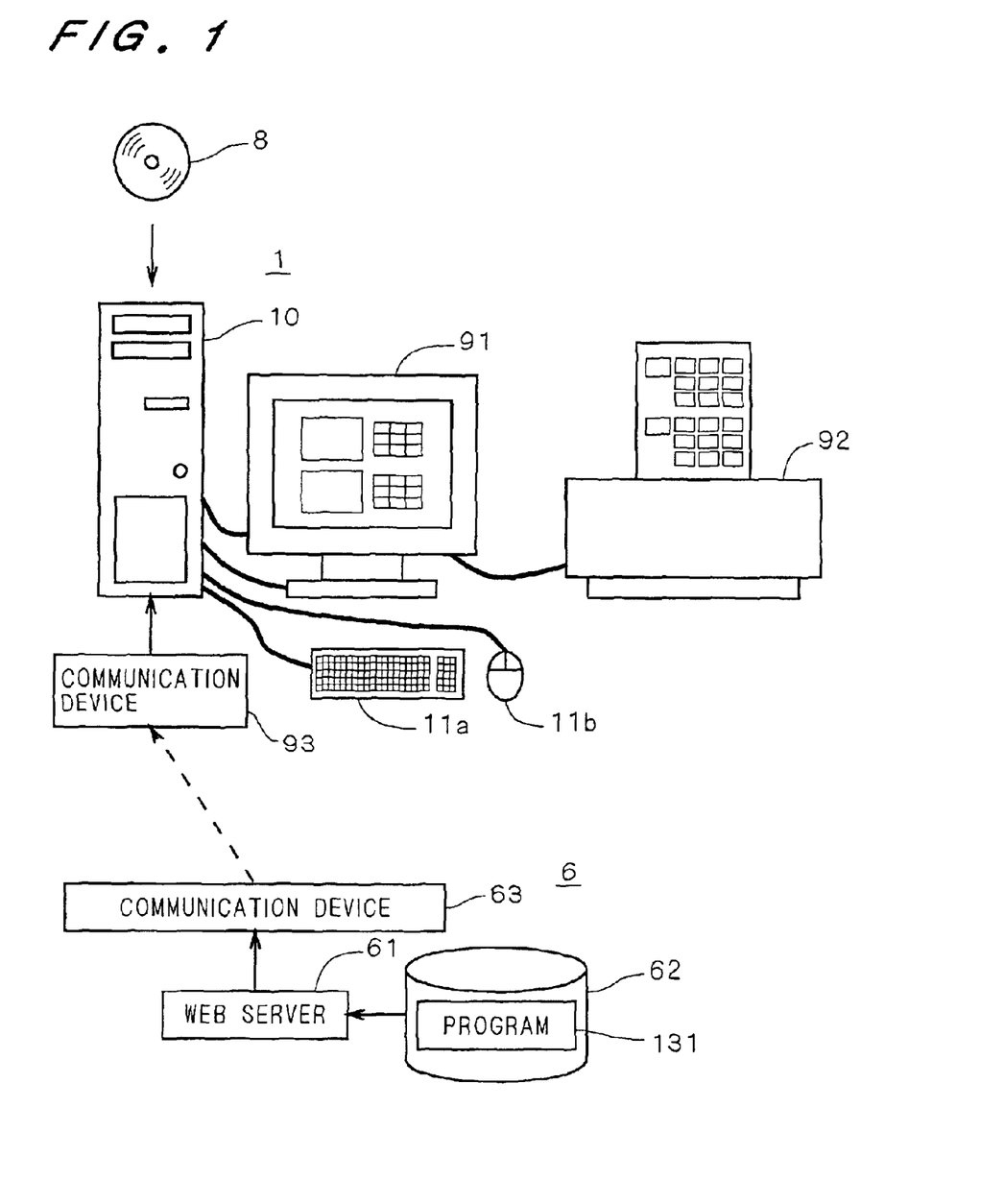
FIG. 1 is a diagram showing the configuration of a color correcting apparatus and peripheral devices.

FIG. 1 is a diagram showing a color correcting apparatus 1 and its peripheral devices. The color correcting apparatus 1 shown in FIG. 1 is realized mainly by a computer 10. A keyboard 11a and a mouse 11b by which the operator enters data are connected to the computer 10. A display 91 and a printer 92 are also connected to the computer 10. The computer 10 and the like function as the color correcting apparatus 1 to correct the printing colors of the printer 92 so as to match with the display colors of the display 91.

In order to make the computer 10, keyboard 11a and mouse 11b function as the color correcting apparatus 1 of the printer 92, a program for correcting printing colors (hereinbelow, called "color correction" as appropriate) is pre-installed to the computer 10 via a recording medium 8 such as an optical disk, magnetic disk, magneto-optic disk, or memory card. The program may be also installed via computer communication such as the Internet. In this case, a program 131 for color correction in a fixed disk 62 (that is, recording device) of a program transmitting apparatus 6 is transferred to the computer 10 via a web server 61, a communication device 63, and a communication device 93 connected to the computer 10.

Figure 2:
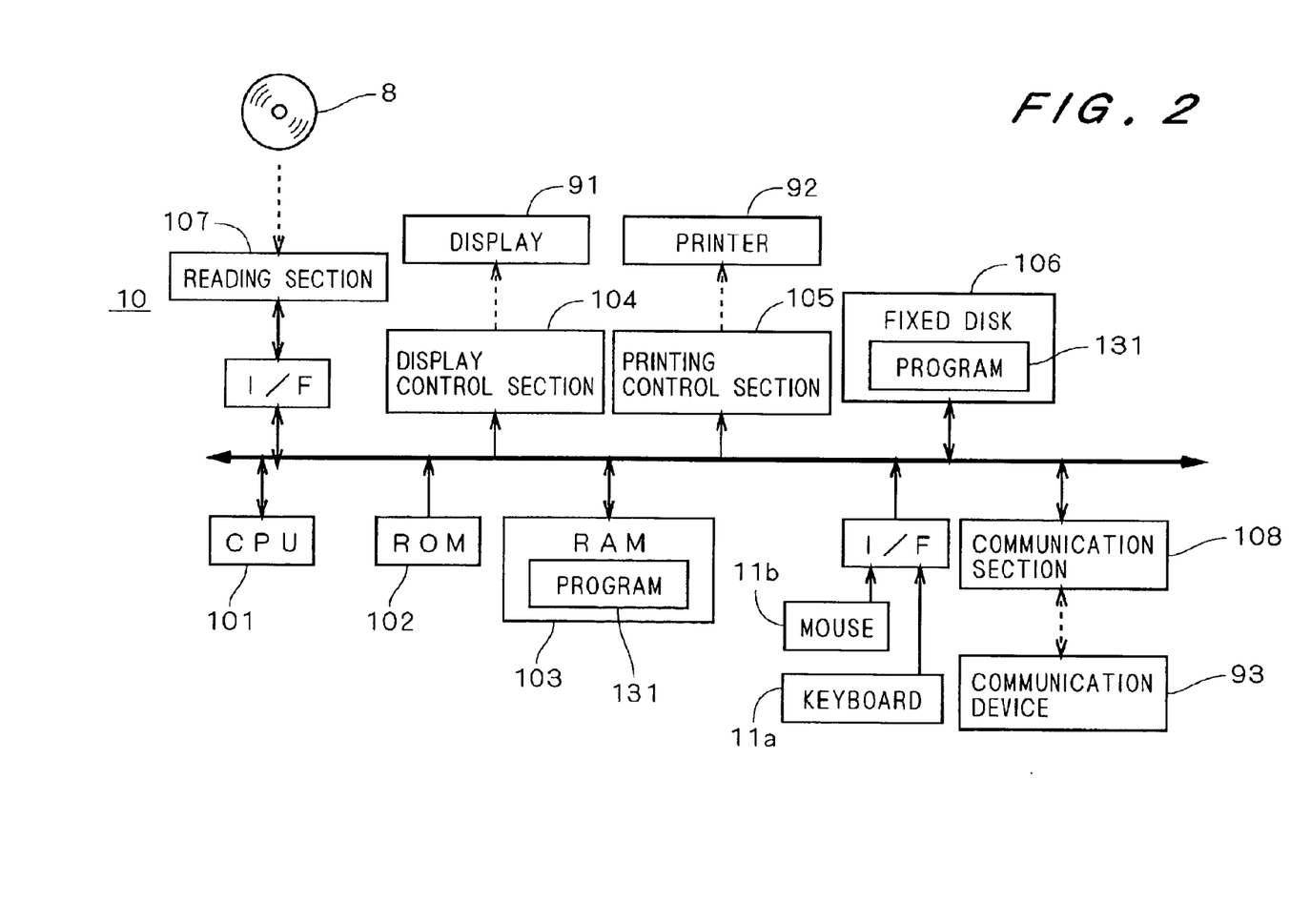
FIG. 2 is a block diagram showing the configuration of a computer and peripheral devices.

FIG. 2 is a block diagram showing the internal configuration of the computer 10 together with peripheral devices. As shown in FIG. 2, the computer 10 has a configuration like that of an ordinary computer, in which a CPU 101 for performing various calculation processes, a ROM 102 for storing a basic program, a RAM 103 as a work area of the calculation processes, and the like are connected to a bus line. To the bus line, a display control section 104 (shown in the diagram as a component corresponding to a device driver for a display and a graphic board) for controlling the display 91, a printing control section 105 (shown in the diagram as a component corresponding to a device driver for a printer and an output port for printing) for transmitting a print signal to the printer 92, a fixed disk 106 for storing various programs including the program 131 for printing, a reading section 107 for reading a program or the like from the recording medium 8, a communication section 108 for performing a communication control of the communication device 93, and the keyboard 11a and the mouse 11b by which the operator enters data are connected via interfaces (I/F) as appropriate.

The program 131 for color correction is stored onto the fixed disk 106 via the reading section 107 or the communication section 108, and is copied to the RAM 103. The CPU 101 performs the calculation process in accordance with the program 131, thereby allowing the computer 10 to which the keyboard 11a and the mouse 11b are connected to function as the color correcting apparatus 1.

Figure 3:
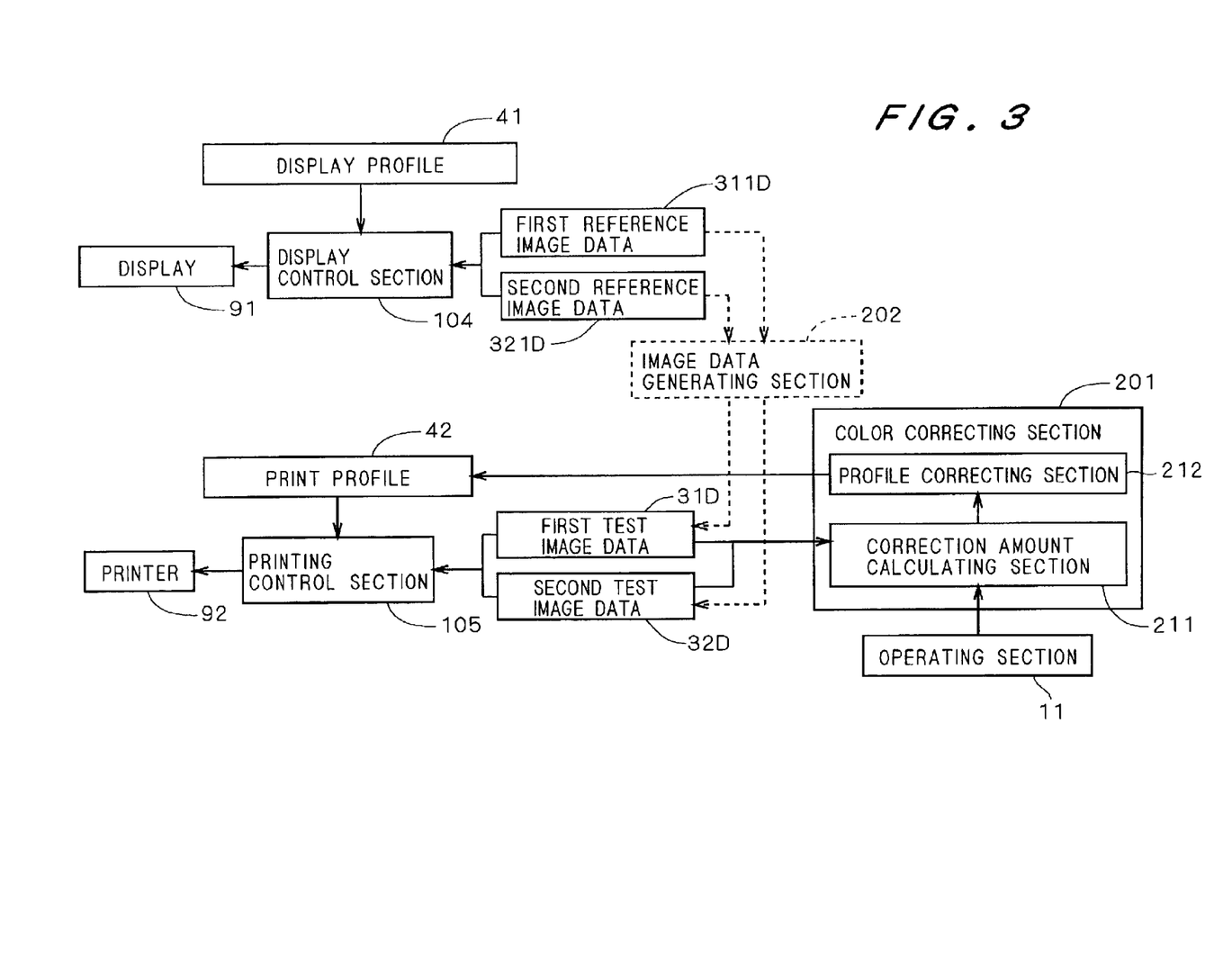
FIG. 3 is a block diagram showing functional components of the computer and the flow of data.

FIG. 3 is a block diagram showing the functional components realized by the CPU 101, ROM 102, RAM 103, etc. in FIG. 2 together with other components. FIG. 3 also shows data to be transmitted as appropriate.

In FIG. 3, a color correcting section 201 and an image data generating section 202 are functions realized by the CPU 101 and the like. The color correcting section 201 can be roughly divided into a correction amount calculating section 211 for calculating correction amounts of the printing colors and a profile correcting section 212 for correcting a profile 42 for printer (hereinbelow, called a "print profile"). The correction amount calculating section 211 receives data entries from an operating section 11 such as the keyboard 11a or mouse 11b.

In FIG. 3, a profile 41 for display (hereinbelow, called a "display profile") is information (for example, in the form of LUT) for transforming values of each color included in an image into values for the display 91. The display control section 104 refers to the display profile 41 to realize color matching of the display 91. Although the display profile 41 is bundled to an operating system (OS) in the computer 10 in this case, it may be stored in a video card.

The print profile 42 is information (for example, in the form of LUT) for transforming values of each color included in an image into values for the printer 92. In other words, the print profile 42 is information for transforming image data to print data and indicates the relation between image data and print data. The printing control section 105 refers to the print profile 42 to realize color matching of the printer 92. Although the print profile 42 is also bundled to the OS in the computer 10 in this case, it may be also stored, for example, as a color rendering dictionary (CRD) in the printer 92.

A first reference image data 311D, a second reference image data 321D, a first test image data 31D, and a second test image data 32D are data stored in the RAM 103 and used when color correction for the printer 92 is expected in the color correcting apparatus 1.

Figure 4:
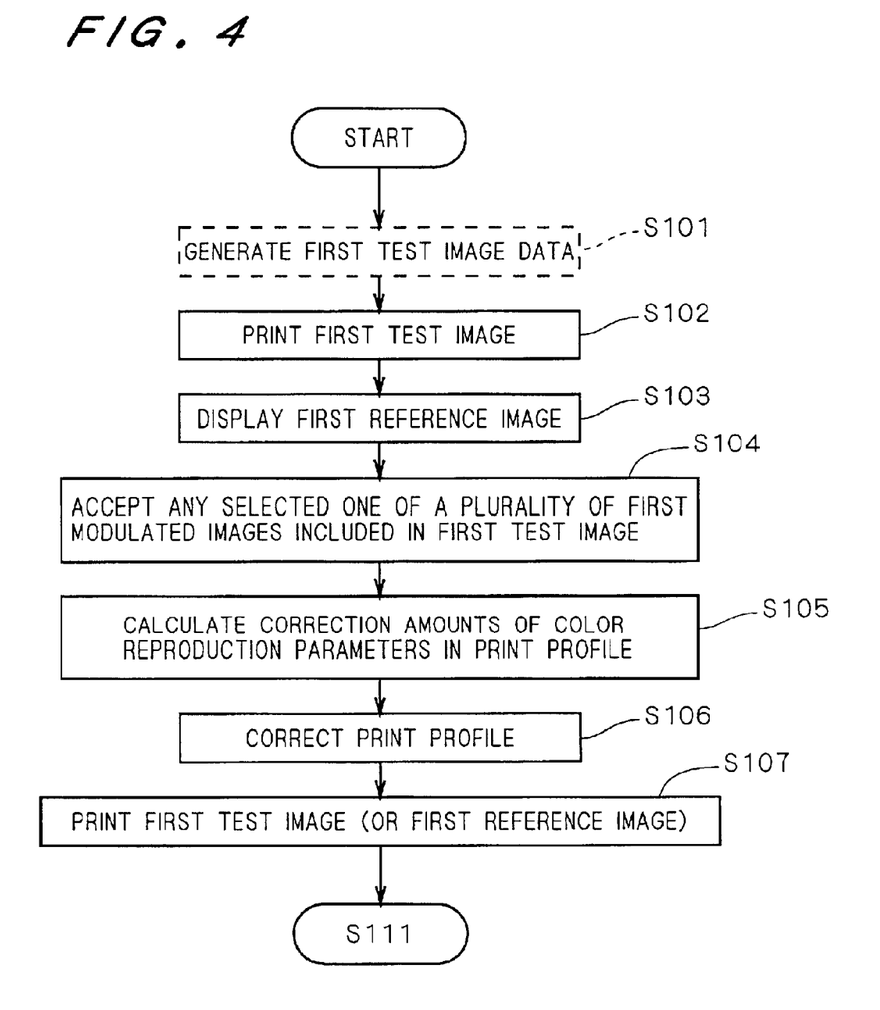
FIGS. 4 and 5 are flowcharts showing the flow of operations of the color correcting apparatus.
Figure 5:
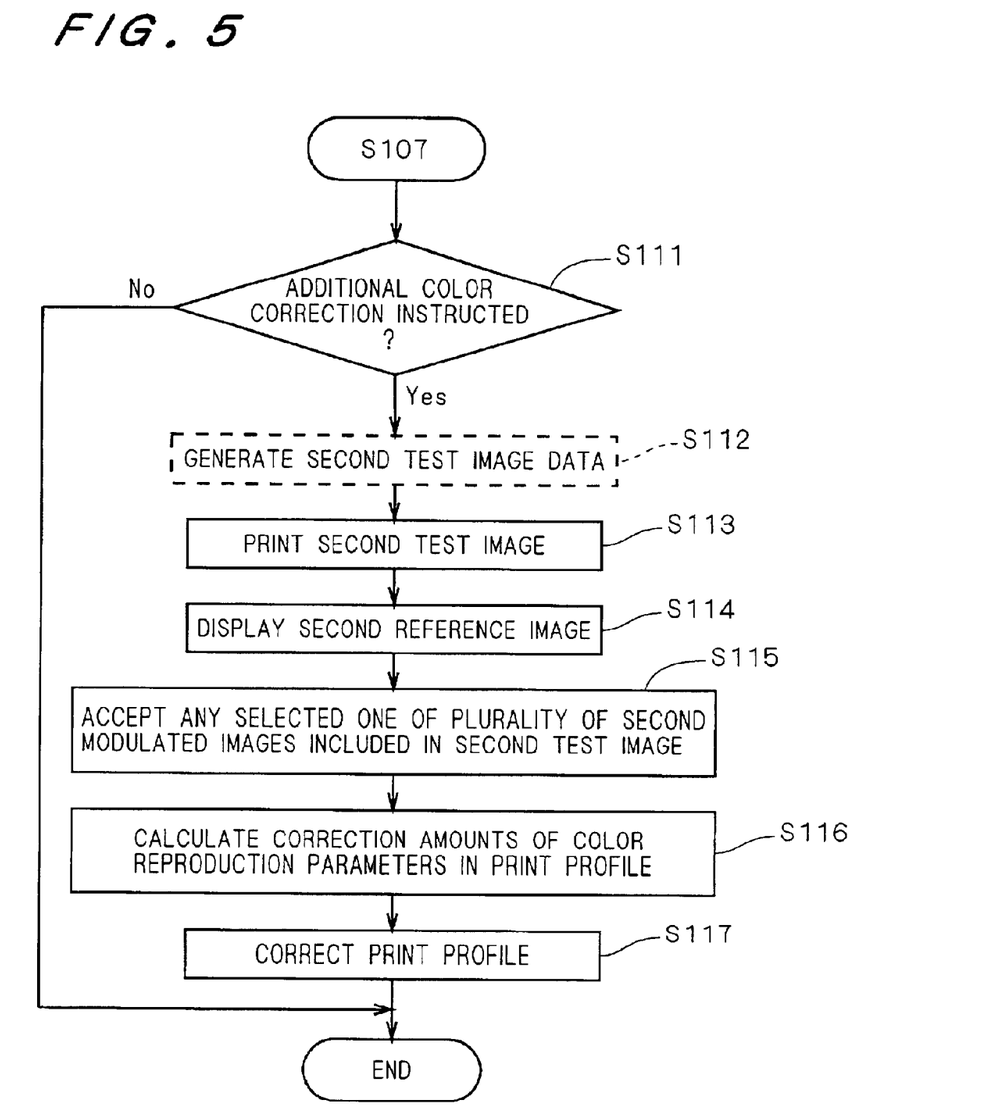

FIGS. 4 and 5 are diagrams showing the flow of operations of the color correcting apparatus 1. Referring to FIGS. 3 to 5, the correction of printing colors of the printer 92 by the color correcting apparatus 1 will be described.

In the color correction, the image data generating section 202 generates the first test image data 31D on the basis of the first reference image data 311D (step S101). In the case where the first test image data 31D is prepared in advance, step S101 is unnecessary.

Figure 6:
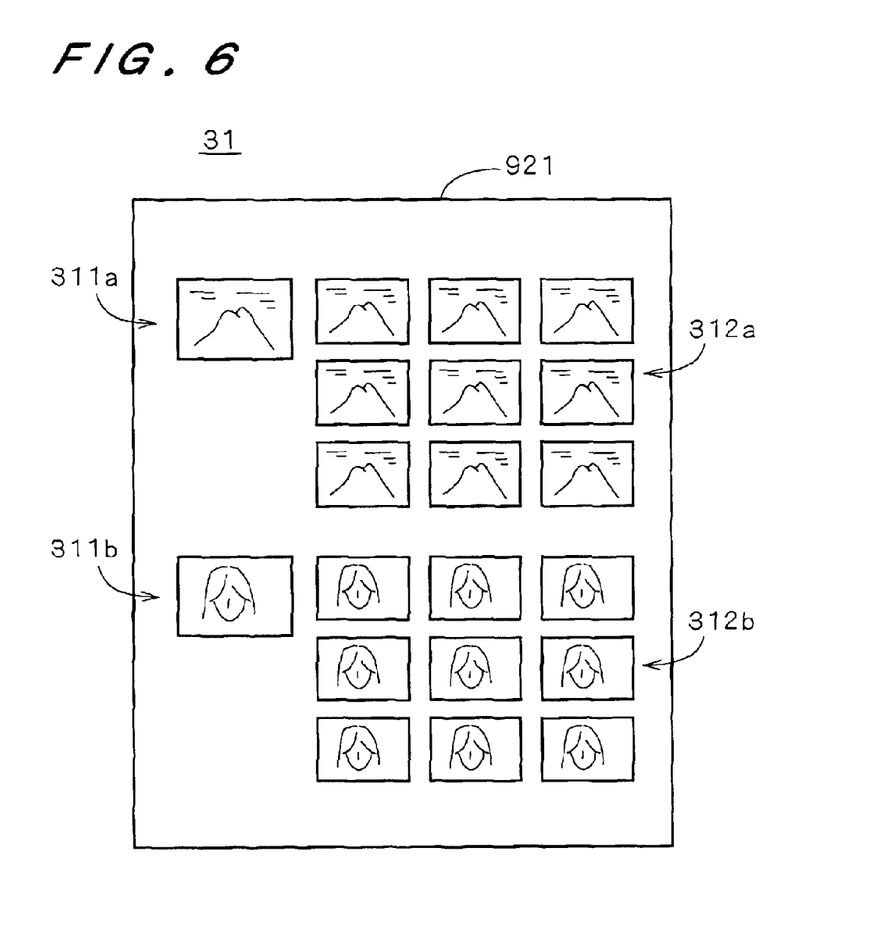
FIG. 6 is a diagram showing a first test image as an example.

FIG. 6 is a diagram showing an image of the first test image data 31D (hereinbelow, called a "first test image 31") printed on a printing paper 921 in step S102 which will be described later, for explaining the state of the first test image 31. The first test image 31 includes first reference images 311a and 311b as references, further, a plurality of first modulated images 312a obtained by slightly modulating the parameters such as hue, saturation, lightness, and contrast of the first reference image 311a in a plurality of ways, and a plurality of first modulated images 312b obtained by slightly modulating the parameters such as hue, saturation, lightness, and contrast of the first reference image 311b.

Specifically, the image data generating section 202 generates the data of the plurality of first modulated images 312a and 312b from the data of the first reference images 311a and 311b and generates the first test image data 31D of an image including the first reference images 311a and 311b and the first modulated images 312a and 312b. FIG. 6 shows just an example of the first test image 31. The number of first modulated images generated from a single first reference image is set as appropriate.

In the following description, when the first reference images 311a and 311b are not distinguished from each other, they will be simply called the first reference images 311. When the first modulated images 312a and 312b are not distinguished from each other, they will be simply called the first modulated images 312.

The first test image 31 is an image used to correct differences of color tones of an entire printed image (or a difference between printed color tones and appropriate color tones). The differences of color tones include, for instance, color distortion such as reddish, and include not only a difference in hue but also differences in elements such as lightness, saturation, and contrast (gamma characteristics) for expressing colors. The first test image 31 is an image including colors of the face of a human, a seed and a leaf of a plant, earth, a cloud, sky, and the like. Those colors are colors everyone remembers and generally called memory colors. In each of the first reference images 311, for example, various earth colors and various sky colors may be included. All of various memory colors may be included in a single first reference image 311. The first test image 31 may be printed so as to be divided into a plurality of printing papers 921.

As the first reference image 311 including such memory colors, it is preferable to use what is called a natural image obtained by photographing an ordinary scene.

Under the control of the printing control section 105 (that is, by allowing the printing control section 105 to control the printer 92 by the CPU and the like), the first test image 31 is printed by the printer 92 in accordance with the first test image data 31D (step S102). At this time, the existing print profile 42 is referred to, and the pixel values of each of pixels in the first test image data 31D are transformed to pixel values for printing. For example, by referring to the print profile 42 in the form of the LUT, RGB values or L*a*b* values of each of pixels in the first test image data 31D are transformed to CMYK values for printing.

Figure 7:
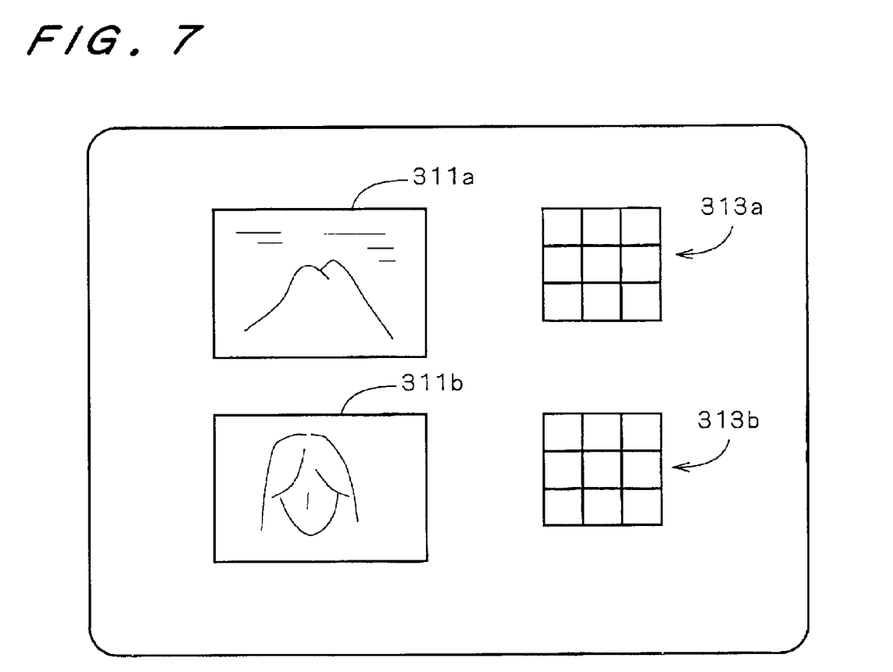
FIG. 7 is a diagram showing a state where first reference images are displayed on a display.

On the other hand, almost simultaneously with step S102, under the control of the display control section 104 (that is, by allowing the display control section 104 to control the display 91 by the CPU and the like), the first reference images 311 are displayed on the display 91 (step S103). FIG. 7 is a diagram showing the state where the first reference images 311a and 311b shown in FIG. 6 are displayed on the display 91. As shown in FIG. 7, on the display 91, a plurality of operation buttons 313a and 313b are displayed in correspondence with the first reference images 311a and 311b such as natural images, respectively. The plurality of operation buttons 313a are disposed in correspondence with the arrangement of the plurality of first modulated images 312a, and the plurality of operation buttons 313b are disposed in correspondence with the arrangement of the plurality of first modulated images 312b. An arbitrary one of the plurality of first modulated images can be selected by using the mouse 11b or the like.

That is, the mouse 11b, the operation buttons displayed on the display 91, the CPU 101, and the like construct a device which accepts the selection of the plurality of first modulated images 312 by the operator.

When the first test image 31 is printed on the printing paper 921 and the first reference images 311a and 311b are displayed on the display 91, the operator finds out the first modulated image 312a having the color tones closest to those of the first reference image 311a displayed on the display 91, and selects the operation button 313a corresponding to the printing position of the found first modulated image 312a. Similarly, the operator selects the operation button 313b corresponding to the printing position of the first modulated image 312b having the color tones closest to those of the first reference image 311b.

When the color tones of the first reference image 311 displayed on the display 91 are closer to those of the printed first reference image 311 than those of any first modulated image 312, the color correction is not performed as a rule. The program may jump to step S112 (or step S113) which will be described later. When the operator makes such a decision, in place of the operation of selecting a first modulated image 312, the first reference image 311 displayed on the display 91 may be selected by the operator.

When the computer 10 accepts the selection of a first modulated image 312 by the operator (step S104), on the basis of the first reference image 311 and the selected first modulated image 312, the correction amount calculating section 211 calculates correction amounts of color reproduction parameters such as hue, saturation, lightness, and contrast with respect to the print profile 42 (step S105). On the basis of the correction amounts of the color reproduction parameters, the profile correcting section 212 corrects the LUT which is the print profile 42 (or updates the LUT to a newly generated profile) (step S106).

The principle of the correction of the print profile 42 is expressed as follows.

First, when the pixel values of the image are expressed by the RGB values, it is assumed that the values of a pixel in the first reference image 311 are $(R_1, G_1, B_1)$ and the values of a pixel in the selected first modulated image 312 corresponding to the pixel in the first reference image 311 are $(R_2, G_2, B_2)$. When the existing display profile 41 is a table for transformation from the RGB colorimetric system to the L*a*b* colorimetric system and the print profile 42 is a table for transformation from the L*a*b* colorimetric system to the CMYK colorimetric system, a function $f_{mon}(\ )$ indicative of the display profile 41 and a function $f_{pri}(\ )$ indicative of the print profile 42 before correction can be expressed as Equation 1.

$$(L^*,a^*,b^*)=f_{mon}(R,G,B)$$

$$(C,M,Y,K)=f_{pri}(L^*,a^*,b^*) \quad [\text{Equation 1}]$$

At the time of printing, therefore, transformation of Equation 2 is performed with respect to the pixel values $(R_1, G_1, B_1)$.

$$(C_1,M_1,Y_1,K_1)=f_{pri}(f_{mon}(R_1,G_1,B_1))$$

$$=f_{pri}(L_1^*,a_1^*,b_1^*) \quad [\text{Equation 2}]$$

Since it is preferable that the pixel values $(R_1, G_1, B_1)$ of the first reference image 311 are transformed to the color $(C_2, M_2, Y_2, K_2)$ of the selected first modulated image 312, a function $g(\ )$ for properly correcting the printing color satisfies Equation 3.

$$(C_2,M_2,Y_2,K_2)=g(C_1,M_1,Y_1,K_1)$$

$$=g(f_{pri}(L_1^*,a_1^*,b_1^*)) \quad [\text{Equation 3}]$$

The function $g(f_{pri}(\ ))$ in Equation 3 corresponds to a function indicative of the corrected print profile 42 for transforming the pixel values in the first reference image 311 in the L*a*b* colorimetric system to a printing color.

On the other hand, since the color $(C_2, M_2, Y_2, K_2)$ is obtained by Equation 4, the function $g(\ )$ can be calculated from the pixel values $(R_1, G_1, B_1)$, pixel values $(R_2, G_2, B_2)$, and Equations 2 to 4, and the function $g(f_{pri}(\ ))$ indicative of the corrected profile can be calculated by using the function $g(\ )$. The function $g(\ )$ may be calculated from the correction amounts of the color reproduction parameters or by referring to the LUT.

$$(C_2,M_2,Y_2,K_2)=f_{pri}(f_{mon}(R_2,G_2,B_2))$$

$$=f_{pri}(L_2^*,a_2^*,b_2^*) \quad [\text{Equation 4}]$$

When the pixel values in the first reference image 311 and the first modulated image 312 are of the L*a*b* colorimetric system, it is unnecessary to consider the function $f_{mon}(\ )$ in the above description. The above description is just an example and the pixel values of an image dealt in the computer 10 may be of any form.

On the basis of the above principle, the correction amount calculating section 211 in the computer 10 calculates the function $g(\ )$, and the profile correcting section 212 corrects the print profile 42 to the function $g(f_{pri}(\ ))$.

As shown in FIG. 6 as an example, when a plurality of first reference images 311 are prepared, the first modulated images 312 to be selected are also plural and a plurality of correction amounts for each color reproduction parameter (when a color reproduction parameter has a plurality of elements, as a rule, a plurality of correction amounts for each element) are calculated. In this case, an average of the plurality of correction amounts of each color reproduction parameter is calculated and, by using the average value as a final correction amount of each color reproduction parameter, the print profile 42 is corrected.

Depending on the first reference image 311 and the first modulated images 312 to be adopted, it is also possible to make the process of calculating such an average value unnecessary. For example, in the case where the first modulated images 312a are images obtained by modulating only the hue of the first reference image 311a and the first modulated images 312b are images obtained by modulating only the lightness of the first reference image 311b in FIG. 6, the correction amounts of the hue and lightness in the color reproduction parameters are independently calculated. Consequently, the process of calculating the average value of the correction amounts is unnecessary.

After completion of the correction of the print profile 42, under the control of the computer 10, the first test image 31 or first reference images 311 are printed by the printer 92 by using the corrected print profile 42 (step S107). The operator checks the printing result to determine whether the print profile 42 is proper or not.

By the processes in step S101 to S106, differences of the color tones of printing colors by the printer 92 is corrected by using the display colors of the display 91 as a reference. However, in the case where the display colors of the display 91 and the printing colors of the printer 92 are different from each other with respect to specific colors, the operator enters an instruction for correcting such color differences (including not only a difference in hue but also differences in the elements such as lightness and saturation for expressing a color).

The difference in the specific colors between the display colors of the display 91 and the printing colors of the printer 92 corresponds to a state where only colors in a local area in a color space among display colors of the display 91 are not properly printed. In the following description, therefore, such a color difference will be called a "local color difference". Since the difference of the color tones corrected in steps S101 to S106 corresponds to the state where the display colors of the display 91 are not properly printed in the whole color space, it will be called a "global color difference" in the following description.

The global color difference is a color difference which occurs when something is wrong with outputting any of color elements in the printer 92. For example, it occurs due to insufficient toner or ink of one color element. The local color difference is a phenomenon which occurs when color matching between the display 91 and the printer 92 is not ideal.

When additional color correction is instructed to correct the local color differences (step S111), the second test image data 32D is generated on the basis of the second reference image data 321D by the image data generating section 202 (step S112). Obviously, the second test image data 32D may be prepared in the RAM 103. In this case, step S112 is unnecessary. When the correction of the local color differences are not instructed, the process of correcting the printing colors is finished (step S111).

When the second test image data 32D is prepared, the image of the second test image data 32D is printed by the printer 92 and the image of the second reference image data 321D is displayed on the display 91 (steps S113 and S114). As in the case of steps S102 and S103, the order of steps S113 and S114 may be arbitrary and the processes of steps S113 and S114 may be performed simultaneously.

Figure 8:
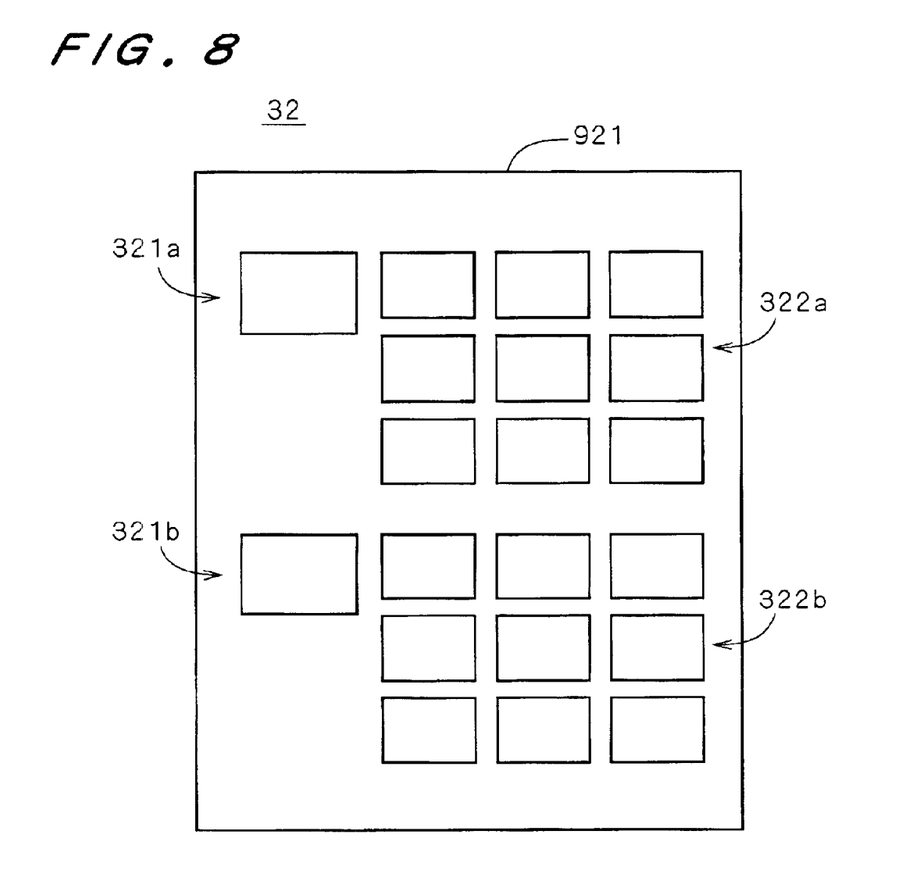
FIG. 8 is a diagram showing a second test image.

FIG. 8 is a diagram showing a state where the image of the second test image data 32D (hereinbelow, called a "second test image 32") is printed on the printing paper 921 as an example. In the second test image 32, in a manner similar to the first test image 31, second reference images 321a and 321b and second modulated images 322a and 322b are included. Each of the second reference images 321a and 321b is an image expressing only a single color. The plurality of second modulated images 322a are images obtained by modulating the parameters such as hue, saturation, and lightness of the second reference image 321a in a plurality of ways. The plurality of second modulated images 322b are images obtained by modulating the parameters such as hue, saturation, and lightness of the second reference image 321b in a plurality of ways. That is, the second test image 32 is an image showing what is called color patches.

Figure 9:
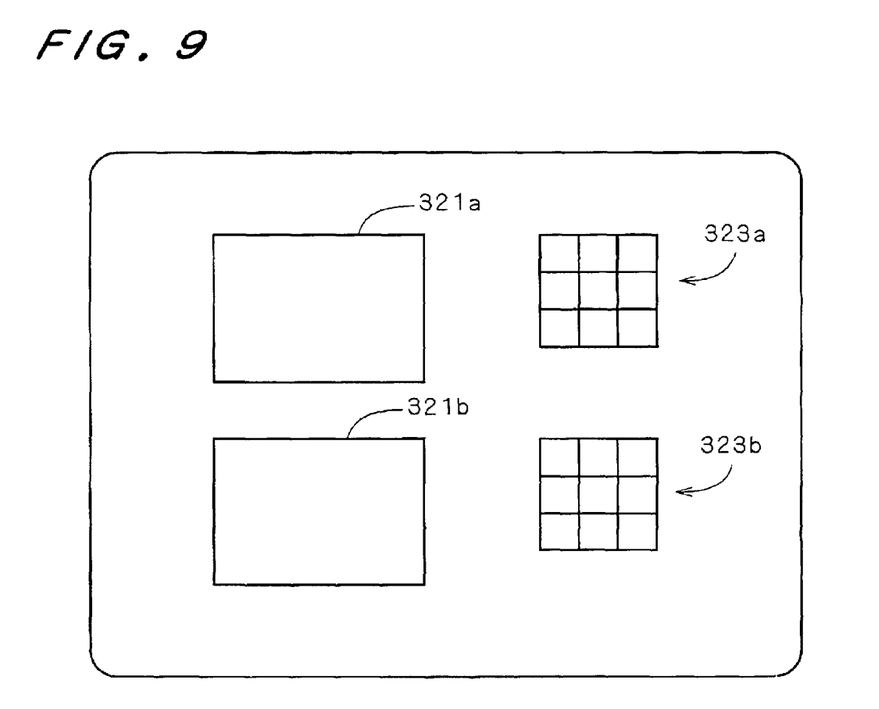
FIG. 9 is a diagram showing a state where second reference images are displayed on a display.

In FIG. 8, only the frames of images are shown but color expressions are not shown (in FIG. 9 as well). Generating colors in the second modulated images 322 by slightly modulating the hue, saturation, and lightness of the color in the second reference image 321 corresponds to generating colors in the second modulated images 322D by differenceing the position in the color space of the color in the second reference image 321 by a plurality of distances to a plurality of directions.

FIG. 9 is a diagram showing the state where the second reference images 321a and 321b are displayed on the display 91 as an example. In a manner similar to FIG. 7, a plurality of operation buttons 323a corresponding to the plurality of second modulated images 322a are displayed next to the second reference image 321a. A plurality of operation buttons 323b corresponding to the plurality of second modulated images 322b are displayed next to the second reference image 321b. By using the operation buttons, the second modulated images 322a and 322b can be selected.

In the following description, when the second reference images 321a and 321b are not discriminated from each other, they will be simply called the second reference images 321. When the second modulated images 322a and 322b are not discriminated from each other, they will be also simply called the second modulated images 322.

When the second test image 32 is printed and the second reference images 321 are displayed on the display 91, in a manner similar to the case of the first test image 31, the operator selects the second modulated image 322 having a color closest to the second reference image 321 displayed on the display 91. When the operator judges that the second reference image 321 displayed on the display 91 has a color closer to the printed second reference image 321 than any of the second modulated images 322, in place of the operation of selecting a second modulated image 322, the operator may select the second reference image 321 displayed on the display 91. In this case, the following correcting process is not performed.

When a second modulated image 322 is selected (step S115), in a manner similar to steps S105 and S106, the correction amount calculating section 211 calculates the correction amounts of the color reproduction parameters such as hue, lightness, and saturation in the print profile 42 (step S116), and the profile correcting section 212 corrects (or updates) the print profile 42 on the basis of the correction amounts. That is, on the basis of the principle described by using Equations 1 to 4, the print profile 42 is corrected (step S117). In such a manner, the local color differences in the color space are corrected.

As shown in FIG. 8, when a plurality of second reference images 321 are prepared, the second modulated images 322 to be selected are also plural. Different from the case of the first reference image, each of the second reference images is formed by a single color. It is sufficient to perform correction with respect to each of the single colors and there is no need to perform the averaging process.

As described above, in the color correcting apparatus 1, by correcting the printing colors on the basis of the first reference image 311 and the selected first modulated image 312, the differences of the color tones between the display colors of the display 91 and the printing colors of the printer 92 (global color differences) are corrected. By correcting the printing colors on the basis of the second reference image 321 and the selected second modulated image 322, the differences (local color differences) between the display colors of the display 91 and the printing colors of the printer 92 with respect to specific colors are corrected. As a result, not only the global color differences in the color space but also the local color differences are corrected, so that the proper correction of the printing colors is realized.

The conventional complicated procedure using the colorimeter is also unnecessary. Further, since the operator himself/herself determines the color differences, the correction of the printing colors in which the operator's preference is reflected can be carried out.

<2. Second Preferred Embodiment>

Figure 10:
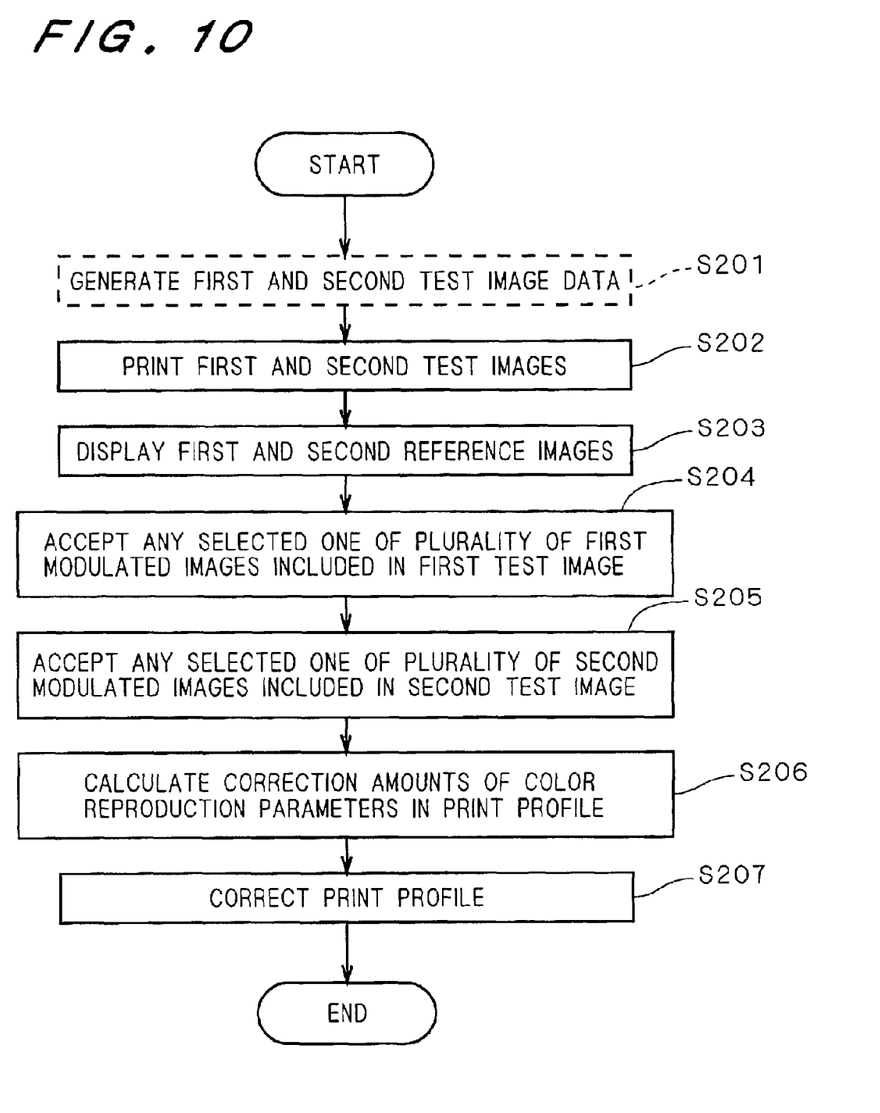
FIG. 10 is a flowchart showing another example of the flow of operations of the color correcting apparatus.

Although the global color differences in the color space are corrected with respect to the printing colors and, after that, the local color differences are corrected in the first preferred embodiment, the corrections can be also simultaneously performed. FIG. 10 is a diagram showing the flow of operations of the color correcting apparatus 1 in the second preferred embodiment. The configuration of the color correcting apparatus 1 is similar to that in the first preferred embodiment. The reference numerals used in the above description will be used as appropriate.

In the second preferred embodiment, first, in a manner similar to the first preferred embodiment, the data of the first and second modulated images 312 and 322 is generated from the first and second reference image data 311D and 321 by the image data generating section 202. The first test image 31 including the first reference images 311 and the plurality of first modulated images 312 and the second test image 32 including the second reference images 321 and the plurality of second modulated images 322 are generated (step S201). When the first and second test images 31 and 32 are prepared, the image data generating section 202 and step S201 are unnecessary.

After that, the first and second test images 31 and 32 are printed by the printer 92 (step S202). Almost simultaneously with step S202, the first and second reference images 311 and 321 are displayed on the display 91 (step S203). On the display 91, operation buttons for selecting the first and second modulated images 312 and 322 are also displayed.

When the images are printed and displayed, the operator selects a first modulated image 312 having the color tones closest to those of each first reference image 311 displayed on the display 91 and selects a second modulated image 322 having the color closest to that of each second reference image 321 (steps S204 and S205). The selection order may be arbitrary. That is, in the second preferred embodiment, steps S101 to S104 and steps S112 to S115 in the first preferred embodiment are carried out in parallel.

In such a manner, the correction amount calculating section 211 in the computer 10 calculates the correction amounts of the color reproduction parameters for correcting the global color differences from the first reference images 311 and the selected first modulated images 312, and calculates the correction amounts of the color reproduction parameters for correcting local color differences from the second reference images 321 and the selected second modulated images 322. Further, average values of a plurality of correction amounts are calculated and final correction amounts are obtained (step S206). That is, steps S106 and S117 in the first preferred embodiment are performed substantially at the same time.

After the correction amounts are obtained, the profile correcting section 212 corrects (or updates) the print profile 42 on the basis of the correction amounts (step S207). Calculation of the correction amounts and correction of the print profile 42 are performed on the basis of the principle similar to those of the first preferred embodiment.

When the operator judges that the color tones of the first reference image 311 displayed on the display 91 are closer to those of the printed first reference image 311 than any first modulated image 312, the first reference image 311 displayed on the display 91 may be selected (or neither of the first modulated images 312 may be selected). In this case, the correction of the global color differences is not considered. The above is similarly performed with respect to the second reference image 321.

As described above, the correction of the global color differences and the correction of the local color differences in the color space of the printing colors with respect to the display colors on the display 91 can be simultaneously carried out. In this case, while realizing the proper correction of the printing colors, the operation by the operator is simplified, and the printing colors can be promptly corrected.

<3. Third Preferred Embodiment>

In the first and second preferred embodiments, the data of first modulated images and second modulated images are generated by the image data generating section 202 or prepared in advance. The first and second modulated images may be printed by using a plurality of print profiles.

In case of using a plurality of print profiles in the first preferred embodiment, the first reference image 311 is printed by using the present print profile 42 and the first modulated images 312 are printed by using a plurality of print profiles in step S102 shown in FIG. 4. The print profiles are generated in advance by changing characteristics slightly from the present print profile 42, and this allows that the first modulated images 312 are images modulated in colors (hue, saturation or lightness) from the first reference image 311.

When the color correcting apparatus 1 accepts the selection of a first modulated image 312 in step S104, the profile correcting section 212 replace the present print profile 42 to the profile corresponding to the selected first modulated image 312 in step S106. Consequently, the differences of color tones (global color differences) between a displayed image and a printed image are eliminated.

In the same manner concerning about the first reference image 311 and the first modulated images 312, the second reference image 321 is printed by using the once changed print profile 42 and the second modulated images 322 are printed by using a plurality of print profiles in step S113. The print profiles are generated in advance by changing characteristics slightly from the once changed print profile 42, and this allows that the second modulated images 322 are images modulated in color from the second reference image 321.

When the color correcting apparatus 1 accepts the selection of a second modulated image 322 in step S115, the profile correcting section 212 replace the once changed print profile 42 to the profile corresponding to the selected second modulated image 322 in step S117. Consequently, the color differences (local color differences) between a displayed image and a printed image are eliminated.

In case of using a plurality of print profiles in the second preferred embodiment, the first and second reference images 311, 312 are printed by using the present print profile 42 and the first and second modulated images 312, 322 are printed by using a plurality of print profiles in step S202 shown in FIG. 10.

After the color correcting apparatus 1 accepts the selection of a first modulated image 312 and a second modulated image 322 in step S204 and S205, the profile correcting section 212 generate a new print profile from the two profiles corresponding to the selected first modulated image 312 and the selected second modulated image 322 and update the print profile in step S207. In this case, global color differences and local color differences are eliminated at the same time.

<4. Modifications>

The foregoing preferred embodiments can be variously modified as follows.

For example, each of the plurality of first modulated images 312 is generated by slightly modifying at least selected one of the group of hue, saturation, lightness, and contrast as characteristics (corresponding to color reproduction parameters) of the first reference image 311 in the foregoing preferred embodiments. Such color reproduction parameters are used in order to obtain the correction amounts in which the operator's preference is more properly reflected. As the color reproduction parameters, any elements can be employed as long as they are elements for reproducing the color tones of an entire image. RGB values and L*a*b* values may be adopted as color reproduction parameters.

As for the second modulated images 322 as well, a plurality of second modulated images 322 are generated by slightly modulating at least one of the parameters (color reproduction parameters) selected from the group of hue, saturation, and lightness which are characteristics of the second reference image 321. Other elements may be also used as color reproduction parameters.

It has been described above that each of the first and second modulated images 312 and 322 is generated by slightly modulating color. "Slightly" denotes "within a range of a correction amounts used to correct printing colors". That is, the modulation amount of the color reproduction parameter is determined within the range of the predetermined correction amount.

Although it has been described above that the first reference image 311 includes a plurality of what is called memory colors, as long as the color tones of an entire image to be printed can be determined, any image can be used. For example, by using an image having a plurality of colors (preferably, a plurality of similar colors, more preferably, which are neighboring) as the first reference image 311, correction of the whole colors in the color space can be realized.

In the above description, the print profile 42 is the LUT used for transforming a color in the L*a*b* colorimetric system to a color in the CMYK colorimetric system. The print profile 42 may be an LUT for transforming a color between other colorimetric systems. For example, an LUT for transforming a color from an XYZ colorimetric system to a CMYK colorimetric system or an LUT for correcting pixel values to the CMY colorimetric system instead of the CMYK colorimetric system. Further, the print profile 42 is not limited to an LUT. For example, it can be described in a determinant from a certain colorimetric system to another colorimetric system.

Although it has been described that an image of a single color is used as the second reference image 321, the color of the second reference image 321 may be preliminarily limited. Specifically, when the operator feels that only a specific printing color is incongruous, only this color may be adopted for the second reference image 321. The parameters (color reproduction parameters) to be modulated when the first and second modulated images 312 and 322 are generated from the first and second reference images 311 and 321 can be also preliminarily selected by the operator. For example, an image obtained by slightly modulating only the hue of the first reference image 311 can be generated as the first modulated images 312.

Each of the first and second test images 31 and 32 may be printed so as to be divided onto a plurality of printing papers 921. The first and second reference images 311 and 321 may be printed on papers different from papers on which the first and second modulated images 312 and 322 are printed.

Although the printing colors are corrected on the basis of the first test image 31 and, after that, the first test image 31 (or first reference images 311) is printed in the first preferred embodiment, this step S107 may not be performed.

Although the color correcting section 201 corrects the print profile 42 in the above description, the print profile 42 does not have to exist as a concept of what is called a profile. That is, it may exist as parameters for adjusting printing colors in the printer 92 or software for adjusting printing colors by the computer 10.

It has been described that the color correcting section 201 and the image data generating section 202 in FIG. 3 are the functions realized by the CPU and the like. All or a part of the functions may be realized as a dedicated electric circuit.

Although it has been described that the program 131 for correcting printing colors may be transmitted from the fixed disk 62 as a starting point in FIG. 1, other recording device in which a recording member such as an optical disk, magnetooptic disk, or semiconductor memory is stored or any computer readable recording device may be used.

While the invention has been shown and described in detail, the foregoing description is in all aspects illustrative and not restrictive. It is therefore understood that numerous modifications and variations can be devised without departing from the scope of the invention.

What is claimed is:

1. A color correcting apparatus comprising:
   a controller for controlling a printer to print a plurality of first modulated images of a first reference image having a plurality of colors, each of said first modulated images being obtained by globally modulating at least one color parameter for the plurality of colors in said first reference image, and for controlling the printer to print a plurality of second modulated images of a second reference image consisting of a single color, each of said second modulated images being obtained by modulating at least one parameter of said single color;
   an input device for accepting a selection of one of said first modulated images from among said plurality of first modulated images in accordance with said first reference image which is displayed and a selection of one of said second modulated images from among said plurality of second modulated images in accordance with said second reference image which is displayed; and
   correcting means for correcting information for transforming image data to print data on the basis of said selected first modulated image and said selected second modulated image, said information indicating a relation between said image data and said print data.

2. The color correcting apparatus of claim 1, further comprising
   a display for displaying said first reference image and said second reference image.

3. The color correcting apparatus of claim 1, wherein
   said controller controls said printer to print said first reference image together with said plurality of first modulated images and to print said second reference image together with said plurality of second modulated images.

4. The color correcting apparatus of claim 1, wherein
   said plurality of first modulated images are respectively obtained by modulating at least one parameter selected from the group comprising hue, saturation, lightness and contrast of said first reference image in a plurality of ways.

5. The color correcting apparatus of claim 1, wherein
   said plurality of second modulated images are respectively obtained by modulating at least one parameter selected from the group comprising hue, saturation, lightness and contrast of said second reference image in a plurality of ways.

6. The color correcting apparatus of claim 1, wherein
said controller prints said plurality of first modulated images and said plurality of second modulated images by using a plurality pieces of information for transforming image data to print data, and
said correcting means corrects said information on the basis of two pieces of information corresponding to said selected first modulated image and said selected second modulated image.

7. A color correcting method comprising the steps of:
a) controlling a printer to print a plurality of first modulated images of a first reference image having a plurality of colors, each of said first modulated images being obtained by globally modulating at least one color parameter for the plurality of colors in said first reference image;
b) controlling said printer to print a plurality of second modulated images of a second reference image consisting of a single color, each of said second modulated images being obtained by modulating at least one parameter of said single color;
c) accepting a selection of one of said first modulated images from among said plurality of first modulated images in accordance with said first reference image which is displayed;
d) accepting a selection of one of said second modulated images from among said plurality of second modulated images in accordance with said second reference image which is displayed; and
e) correcting information for transforming image data to print data on the basis of said selected first modulated image and said selected second modulated image, said information indicating a relation between said image data and said print data.

8. The color correcting method of claim 7, further comprising the step of
displaying said first reference image and said second reference image.

9. The color correcting method of claim 7, wherein
said first reference image is printed together with said plurality of first modulated images in said step a), and
said second reference image is printed together with said plurality of second modulated images in said step b).

10. The color correcting method of claim 7, wherein
said plurality of first modulated images are respectively obtained by modulating at least one parameter selected from the group comprising hue, saturation, lightness and contrast of said first reference image in a plurality of ways.

11. The color correcting method of claim 7, wherein
said plurality of second modulated images are respectively obtained by modulating at least one parameter selected from the group comprising hue, saturation, lightness and contrast of said second reference image in a plurality of ways.

12. The color correcting method of claim 7, wherein
said plurality of first modulated images and said plurality of second modulated images are printed by using a plurality pieces of information for transforming image data to print data in said steps a) and b), and
said information is corrected on the basis of two pieces of information corresponding to said selected first modulated image and said selected second modulated image in said step e).

13. A color correcting method comprising the steps of:
a) controlling a printer to print a plurality of first modulated images of a first reference image having a plurality of colors on the basis of first information for transforming image data to print data, said first information indicating a relation between said image data and said print data, each of said first modulated images being obtained by globally modulating at least one color parameter for the plurality of colors in said first reference image;
b) accepting a selection of one of said first modulated images from among said plurality of first modulated images in accordance with said first reference image which is displayed;
c) correcting said first information on the basis of said selected first modulated image to obtain second information;
d) controlling said printer to print a plurality of second modulated images obtained by modulating a color of a second reference image consisting of a single color on the basis of said second information, each of said second modulated images being obtained by modulating at least one parameter of said single color;
e) accepting a selection of one of said second modulated images from among said plurality of second modulated images in accordance with said second reference image which is displayed; and
f) correcting said second information on the basis of said selected second modulated image to obtain third information.

14. The color correcting method of claim 13, further comprising the steps of:
displaying said first reference image during said step b); and
displaying said second reference image during said step e).

15. The color correcting method of claim 13, wherein
said first reference image is printed together with said plurality of first modulated images in said step a), and
said second reference image is printed together with said plurality of second modulated images in said step d).

16. The color correcting method of claim 13, wherein
said plurality of first modulated images are respectively obtained by modulating at least one parameter selected from the group comprising hue, saturation, lightness and contrast of said first reference image in a plurality of ways.

17. The color correcting method of claim 13, wherein
said plurality of second modulated images are respectively obtained by modulating at least one parameter selected from the group comprising hue, saturation, lightness and contrast of said second reference image in a plurality of ways.

18. The color correcting method of claim 13, further comprising the step of
controlling said printer to print said first reference image on the basis of said second information before said step d).

19. The color correcting method of claim 13, wherein
said plurality of first modulated images are printed by using a plurality pieces of information for transforming image data to print data in said step a), and
one of said plurality pieces of information is selected as said second information in said step c).

20. The color correcting method of claim 13, wherein said plurality of second modulated images are printed by using a plurality pieces of information for transforming image data to print data in said step d), and one of said plurality pieces of information is selected as said third information in said step f).

* * * * *